United States Patent
Sylvain

(10) Patent No.: US 7,050,565 B2
(45) Date of Patent: May 23, 2006

(54) MULTIMEDIA AUGMENTED CALL COVERAGE

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 640 days.

(21) Appl. No.: 10/261,577

(22) Filed: Oct. 1, 2002

(65) Prior Publication Data

US 2004/0062382 A1   Apr. 1, 2004

(51) Int. Cl.
*H04M 3/00* (2006.01)
(52) U.S. Cl. .................... 379/265.09; 379/207.01; 379/211.04; 379/265.02
(58) Field of Classification Search .......... 379/207.01, 379/211.04, 265.01, 265.02, 265.06, 265.09, 379/900
See application file for complete search history.

(56) References Cited

U.S. PATENT DOCUMENTS

| | | | |
|---|---|---|---|
| 5,454,032 A * | 9/1995 | Pinard et al. .......... 379/167.05 |
| 5,790,798 A * | 8/1998 | Beckett et al. ............. 709/224 |
| 6,011,843 A * | 1/2000 | Hochman et al. ...... 379/211.04 |
| 6,215,865 B1 * | 4/2001 | McCalmont ........... 379/212.01 |
| 6,295,293 B1 | 9/2001 | Tonnby et al. .............. 370/389 |
| 6,442,268 B1 | 8/2002 | Klaghofer et al. .......... 379/229 |
| 6,459,787 B1 * | 10/2002 | McIllwaine et al. ... 379/265.06 |
| 6,539,077 B1 | 3/2003 | Ranalli et al. ............. 379/67.1 |
| 6,594,254 B1 | 7/2003 | Kelly ........................ 370/352 |
| 6,600,819 B1 * | 7/2003 | Catley et al. .......... 379/205.01 |
| 6,697,478 B1 * | 2/2004 | Meldrum et al. ...... 379/211.04 |
| 6,754,693 B1 * | 6/2004 | Roberts et al. ............. 709/205 |
| 6,822,957 B1 | 11/2004 | Schuster et al. ............ 370/389 |

FOREIGN PATENT DOCUMENTS

| | | |
|---|---|---|
| EP | 1148688 A1 | 10/2001 |
| WO | WO 01/69883 A2 | 9/2001 |
| WO | WO 02/11411 A1 | 2/2002 |

OTHER PUBLICATIONS

PCT International Search Report for PCT/IB03/04263, mailed Feb. 16, 2004.

* cited by examiner

*Primary Examiner*—Bing Q. Bui
(74) *Attorney, Agent, or Firm*—Withrow & Terranova, PLLC

(57) ABSTRACT

A technique for sharing multimedia sessions between users that share a directory number allows incoming calls to be routed to both phones. Once one party picks up, the other party is alerted to this fact. Both parties may then exchange multimedia information to help in the handling and disposition of the call.

45 Claims, 9 Drawing Sheets

MULTIMEDIA AUGMENTED CALL COVERAGE

FIELD OF THE INVENTION

The present invention relates to using multimedia features to supplement call coverage for two or more entities that share an extension.

BACKGROUND OF THE INVENTION

Traditional telephony services provided by digital switches, such as digital multiplexing switches, have reached their functional limits with existing user interfaces, which essentially are telephone sets having limited displays and simple keypads. Further, the telephone sets have limited bandwidth. Over newer packet networks, multimedia services are flourishing and are capable of exploiting the capabilities of advanced user terminals, desktop computers, and network appliances.

Currently, the vast majority of voice telephony is provided, at least in part, by traditional circuit-switched networks. Given the extensive infrastructure, reliability, and quality of service, the traditional telephony systems are likely to remain a significant part of communications for the foreseeable future. Unfortunately, there has been difficulty integrating voice sessions over the traditional telephony network with multimedia sessions over packet networks. Users prefer the traditional telephony network for voice, yet the voice network is unacceptable for facilitating advanced multimedia services, such as screen sharing, video conferencing, and the like.

In addition to the difficulties of integrating the voice and multimedia sessions, integrating services that heretofore were available on voice systems is proving problematic. For example, several years ago, a voice service was introduced which allowed two extensions to share a number such that if a call came in, the phone at both locations would ring, calls could be put on hold at one phone and picked up at the other, or other similar sorts of activities. This was particularly useful for boss-secretary arrangements.

While the problem of porting this functionality over to a packet based network has been solved, there remains a need to exploit the full force and power of multimedia services in combination with this call coverage functionality.

SUMMARY OF THE INVENTION

The present invention uses a combined user agent to allow parties associated with a shared directory number to communicate with each other in the multimedia domain before, during, and after a call. This allows the parties to share information about the nature of the call, determine how a call should be handled, and assure that incoming calls have been answered.

In a particular embodiment of the present invention, a call is made to an intended recipient. The intended recipient has a second individual associated therewith providing joint call coverage. The call is routed to a combined user agent, which receives information about the caller so that call screening and routing may be performed based on a pre-established user profile. Call information is forwarded to computers associated with both the intended recipient and the second individual.

When one party answers the call, the phone at the other location stops ringing. The answering party may initiate a multimedia session with the other party so that an informed decision may be made as to who is best to handle the call. Alternatively, the individual answering the call may annotate call logs using multimedia features and share the annotations with the other individual. Incoming or outgoing call logs may also be shared between the parties for outgoing calls.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is designed to allow individuals that share an extension number or directory number to communicate with one another in the multimedia domain such that the call is handled appropriately. Instant messaging, whiteboarding, video sessions, and other multimedia functions may be exchanged between the two individuals to help the individuals arrive at a mutual decision on how the call should be handled or to pass information relating to the call back and forth so that both parties are fully apprised of events surrounding incoming and outgoing calls.

Underlying this invention is commonly owned technology embodied in U.S. patent application Ser. No. 10/028,510, filed Dec. 20, 2001, which is hereby incorporated by reference in its entirety, which discusses facilitating efficient unification of parallel voice and multimedia sessions, wherein the voice session takes place in part over a traditional circuit-switched telephony network. A call signaling agent is created to control packet-based multimedia sessions, as well as to control call signaling at a traditional telephony switch, for a telephone and an associated multimedia device, such as a computer. The multi-functional call processing agent, typically referred to as a combined user agent (CUA), can effectively establish multimedia sessions with the multimedia device and voice calls with the telephone.

Figure 1:
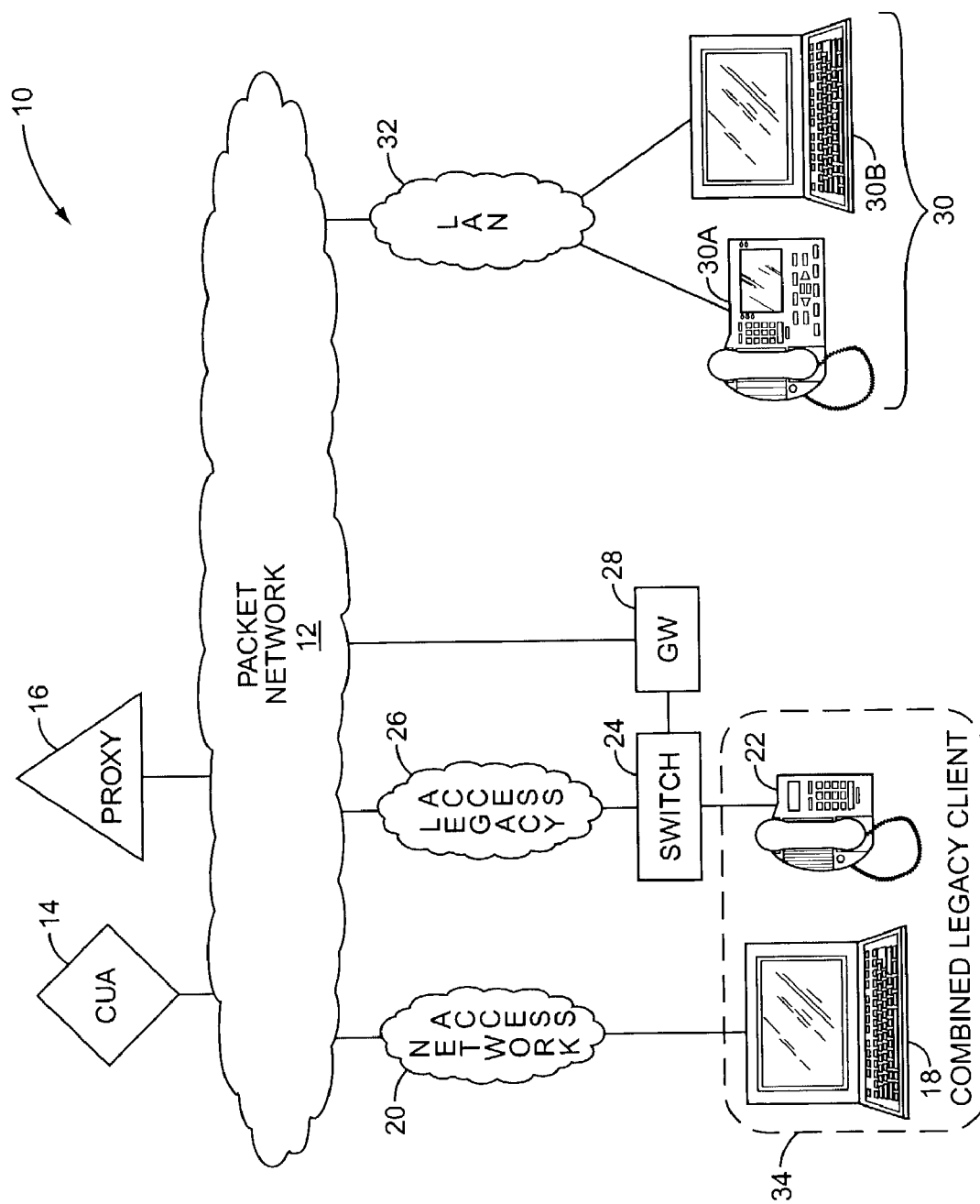
FIG. 1 is a schematic of a communication environment adapted to support the present invention.

With reference to FIG. 1, a communication environment 10 according to the teachings of the '510 application is illustrated. The communication environment 10 may include a packet network 12 having a CUA 14 and a supporting proxy 16. The CUA 14 acts a virtual agent for a computing device, such as a computer 18, which is capable of supporting multimedia sessions. The computer 18 may connect to the packet network 12 via a network access 20, which may include a local area network (LAN), frame relay, digital subscriber line, cable, or other such methods.

The CUA 14 also acts as an agent for a traditional telephony device, such as a telephone 22, which is supported by a telephony switch 24 such as a DMS-100 central office switch, sold by Nortel Networks Limited of 2351 Boulevard Alfred-Nobel, St. Laurent, Quebec, Canada H4S 2A9, public branch exchange (PBX), or the like, that is capable of providing circuit-switched communications between the telephone 22 and other telephony devices. To allow the CUA 14 to interact with and control the telephony switch 24, legacy access 26 is provided between the packet network 12 and the telephony switch 24. The legacy access 26 may be provided by existing intelligent networks (IN), including the advanced intelligent network (AIN), session initiation protocol for telephones (SIP-T) capable networks, TAPI networks, and the like, that provide access to telephony switches 24 to facilitate call signaling. The CUA 14 is configured to establish multimedia sessions over network access 20 with the computer 18, as well as provide call signaling for the telephone 22 through the telephony switch 24 via the legacy access 26.

Although the concepts of the present invention are applicable to various communication environments and related protocols, the present invention is preferably implemented using the session initiation protocol, commonly referred to as SIP. The specification for SIP is provided in the Internet Engineering Task Force's Request for Comments (RFC) 3261: Session Initiation Protocol Internet Draft, which is hereby incorporated by reference in its entirety. In general, SIP is used to establish media sessions between any number of endpoints. Typically, these endpoints may support any number or combination of data, audio, and voice media sessions, depending on the configuration of the device. A SIP endpoint is capable of running an application, typically referred to as a user agent (UA), which is capable of facilitating media sessions using SIP. In certain embodiments, user agents may register their ability to establish sessions with a SIP proxy by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, typically by providing the Internet Protocol (IP) address and port that the user agent will use for SIP sessions. When a user agent wants to establish a session with another user agent, the user agent initiating the session may send an INVITE message to the SIP proxy and specify the target user agent in the TO header of the INVITE message. Identification of the user agent takes the form of a SIP URL. The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities may be exchanged in other messages, such as the SIP "INFO" message. Media capabilities are typically described using the session description protocol (SDP). Once respective endpoints are in an active session with each other and have determined each other's capabilities, the specified media content may be exchanged during an appropriate media session.

According to the Internet Engineering Task Force's RFC 3261, a user agent is an application that contains both a user agent client and a user agent server. A user agent client generally refers to a client application that initiates SIP requests, wherein a user agent server is an application that contacts the user when a SIP request is received, and returns a response on behalf of the user. Typically, the response accepts, rejects, or redirects the received request.

FIG. 1 illustrates the CUA 14, which is an application, program, or function that acts on behalf of a multimedia client, provided by the computer 18 or like device, and a telephone 22. The computer 18 may have a SIP user agent, which is represented by the CUA 14. In essence, the CUA 14 will function to control call signaling to effect voice sessions between the telephone 22 and other devices via the telephony switch 24, and other multimedia sessions via the computer 18. Notably, the CUA 14 can effectively facilitate the integration of and association of voice and other multimedia sessions provided by both devices. To devices needing to establish sessions with either the computer 18 or the telephone 22 in a SIP environment, the CUA 14 presents both devices as a single device having voice and other multimedia capabilities. The other devices need not know that the telephone 22 resides on a circuit-switched network.

In one embodiment, the CUA 14 will cooperate with the proxy 16, which is configured as a SIP proxy, in traditional fashion to establish multimedia sessions involving the computer 18. The sessions will be supported across the network access 20 in the packet network 12. With respect to voice communications via the telephone 22, the voice path may take various routes, remaining entirely within the public switched telephone network (PSTN), or venturing into the packet network 12 to communicate with a packet-switched telephony device or simply to bridge to another circuit-switched network.

The communication environment 10 illustrated in FIG. 1 illustrates voice communications between the telephone 22 and a voice-capable packet-switched device 30, such as an IP telephone 30A or a computer 30B. The packet-switched devices 30 are connected to the packet network 12 via a local area network (LAN) 32 to support packet-switched communications. Since the telephone 22 and telephony switch 24 facilitate circuit-switched communications, a gateway (GW) 28 is integrated with the telephony switch 24 or provided as a separate device (as shown) to convert circuit-switched communications to packet-switched communications capable of being transported over the packet network 12 to the desired packet-switched device 30. The connection between the telephony switch 24 and the gateway 28 may be any traditional telephony line or trunk. The gateway 28 appears to the telephony switch 24 as another switching device supporting a variety of telephone numbers, which are associated with the packet-switched devices 30. Typically, the time-division multiplexed (TDM) circuit-switched communications are converted into packets to facilitate voice communications over the Internet Protocol (VoIP). Importantly, although the voice session spans the circuit-switched and packet-switched networks, the CUA 14 represents the telephone 22 to the devices with which it communicates. In essence, the telephone 22 and the computer 18 form a combined legacy client 34, which is represented by the CUA 14.

Figure 2:
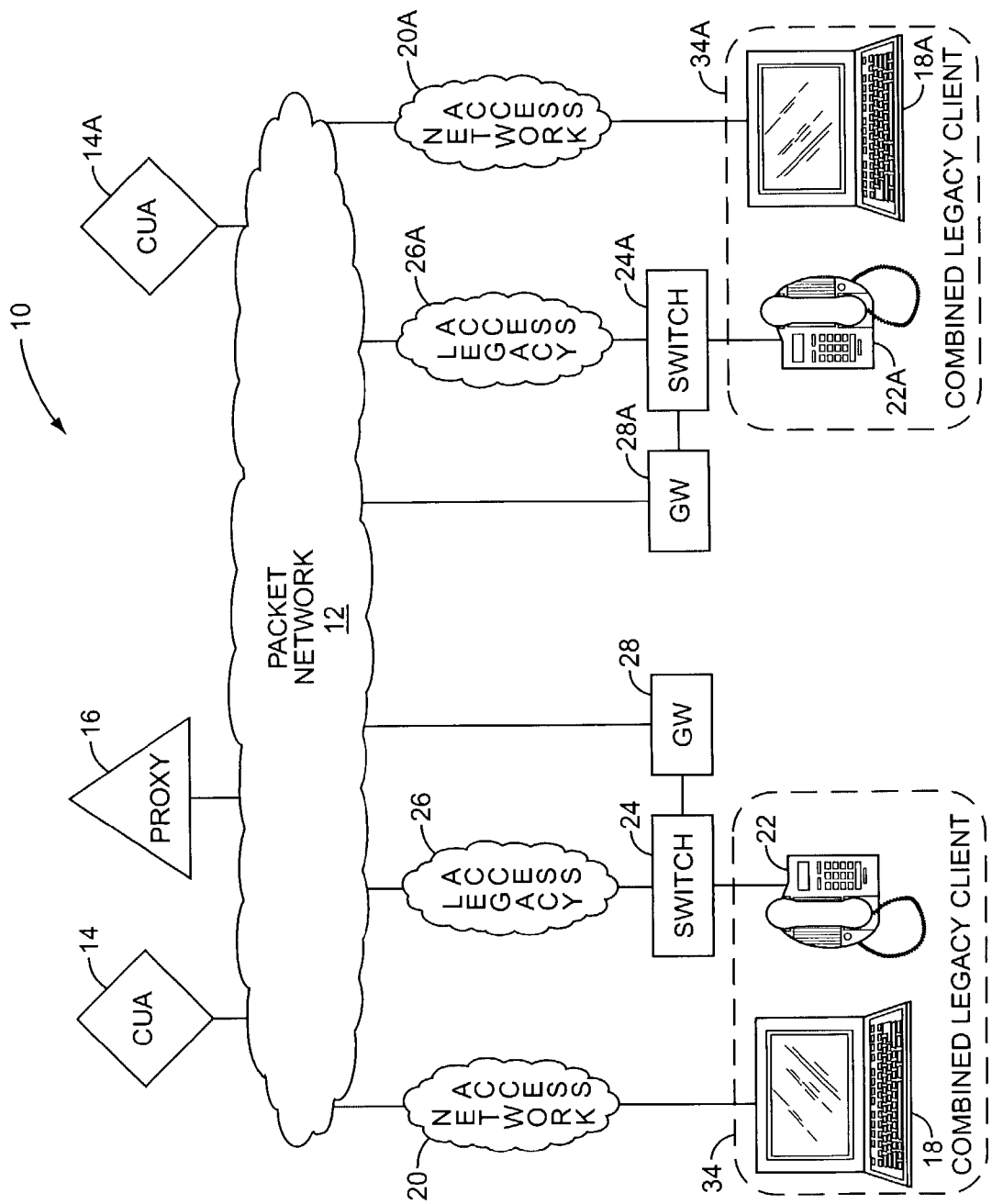
FIG. 2 is a second embodiment of a communication environment adapted to support the present invention.

With reference to FIG. 2, another CUA 14A is provided to support a computer 18A via network access 20A and a circuit-switched telephone 22A, which is supported by telephony switch 24A. The CUA 14A provides call signaling to the telephony switch 24A via legacy access 26A in a similar manner to that described above. Further, the telephony switch 24A is associated with a gateway 28A to convert circuit-switched communications into packet-switched communications for transport over the packet network 12. The communication environment 10 in FIG. 2 illustrates the communication path between telephone 22 and telephone 22A during a voice session being routed over the packet network 12 between the gateways 28 and 28A. Multimedia sessions other than voice between computers 18 and 18A may be established in traditional fashion over the packet network 12. Again, the CUA 14 represents the combined legacy client 34 containing the computer 18 and the telephone 22, whereas the CUA 14A supports the combined legacy client 34A, which is made up of the computer 18A and the telephone 22A. In this embodiment, the CUA 14A is supported by the proxy 16.

Figure 3:
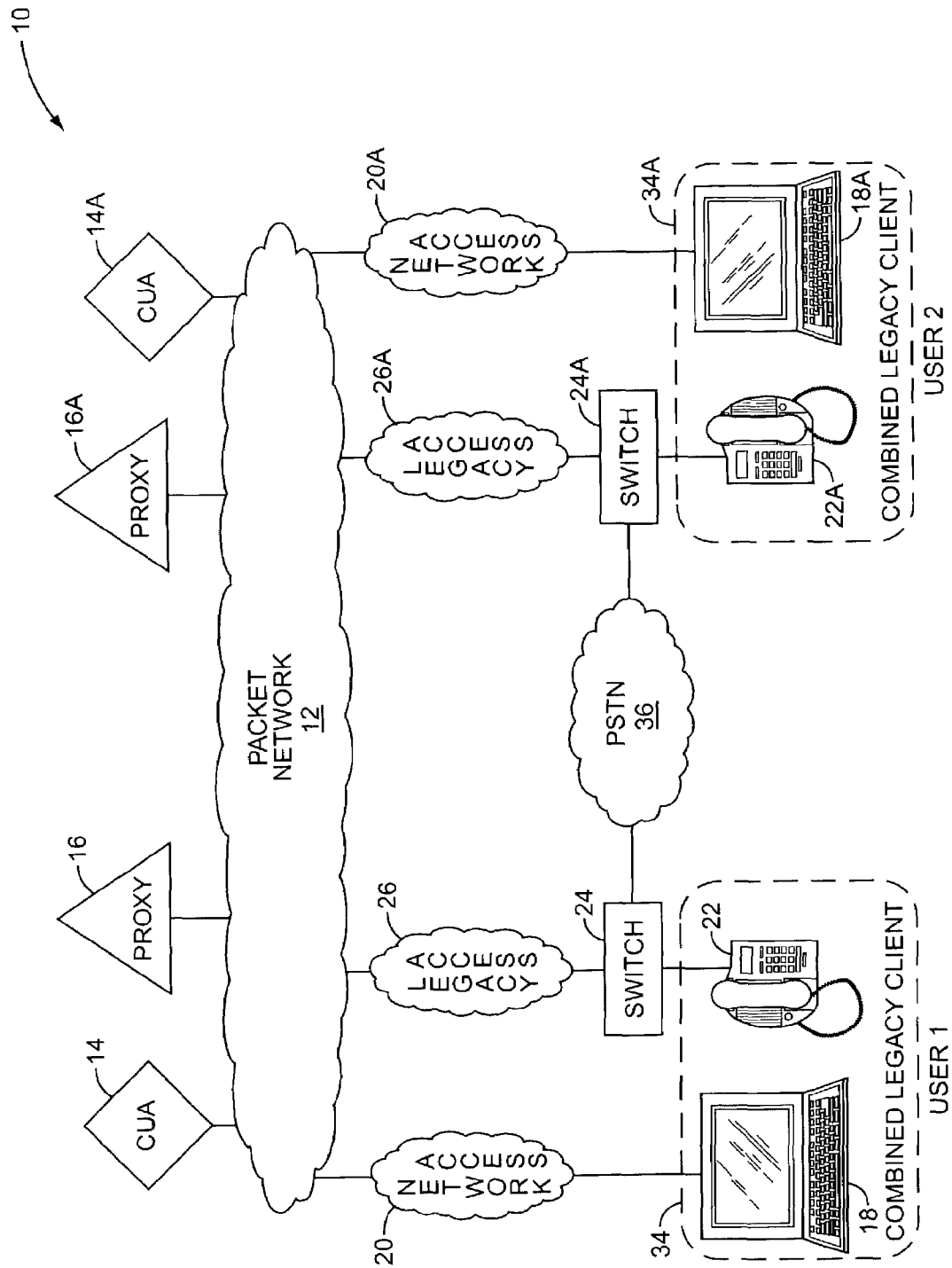
FIG. 3 is an alternate embodiment of the communication environment of FIG. 2.

With reference to FIG. 3, the CUA 14A may be supported by a separate proxy 16A. Further, the communications between the telephone 22 and the telephone 22A during a voice session may be supported entirely within the PSTN 36. The CUAs 14, 14A may provide call signaling not only to the respective telephony switches 24, 24A, but also to other network elements within the PSTN 36 such that they have enough information to establish an end-to-end connection across the PSTN 36. In short, the CUAs 14, 14A are configured to provide the necessary call signaling to establish voice sessions that are supported at least partially over the circuit-switched network of the PSTN 36, as well as multimedia sessions with the computer 18 over the packet network 12.

Figure 4:
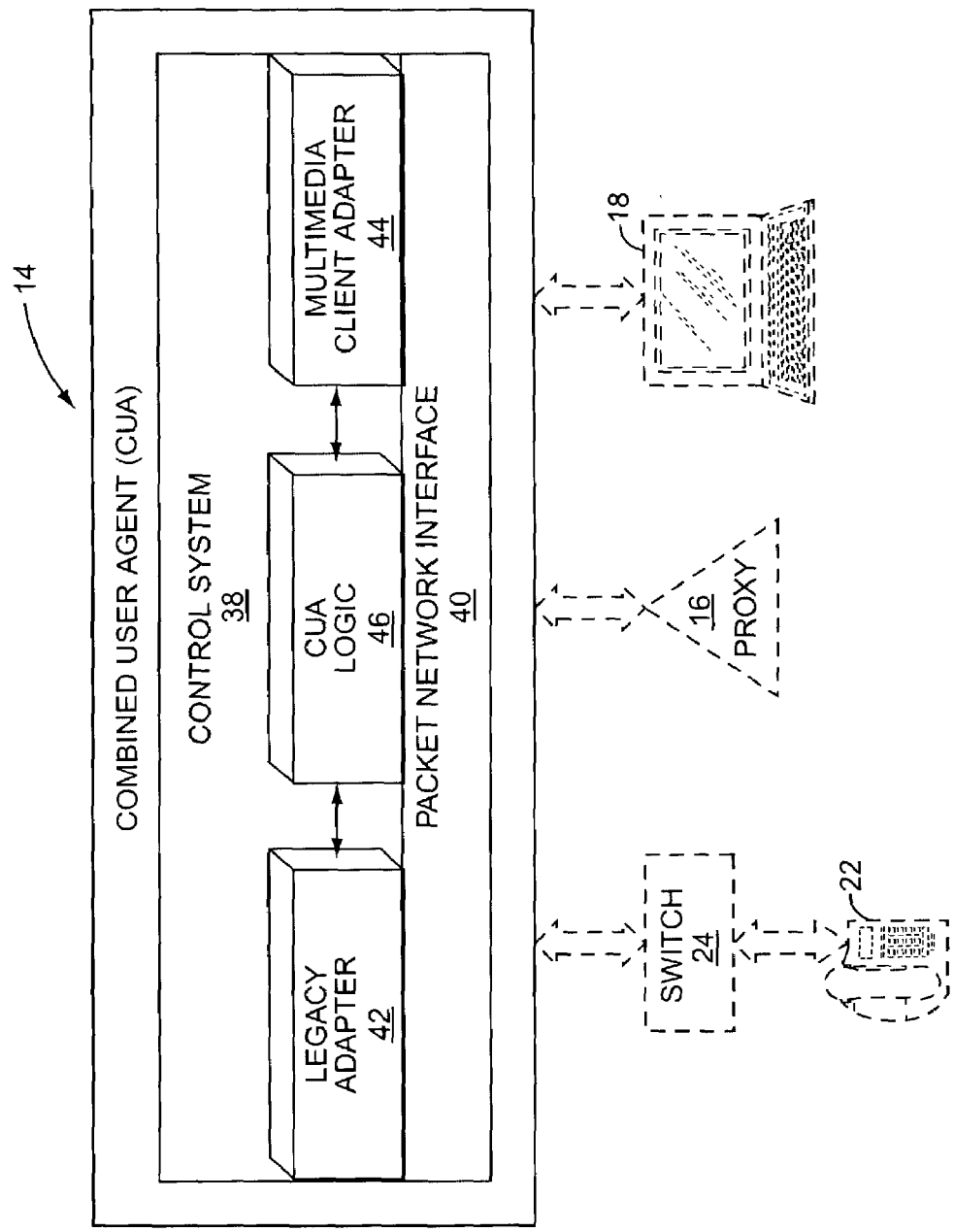
FIG. 4 is a block diagram of a combined user agent according to the present invention.

As illustrated in FIG. 4, the combined user agent 14 is preferably implemented in a control system 38 associated with a packet network interface 40 for communicating over the packet network 12. The control system 38 will support software applications providing a legacy adapter 42, a multimedia client adapter 44, and the basic CUA logic 46. The legacy adapter 42 will provide the necessary protocol adaptation and call signaling control necessary to control the telephony switch 24 in light of SIP or related protocols for establishing media sessions. The multimedia client adapter 44 is used to support sessions with the associated computer 18 or like multimedia device. The multimedia client adapter 44 may provide protocol adaptation as necessary to establish the media sessions of a SIP implementation, wherein when the computer 18 emulates a SIP client, the CUA logic 46 will simply represent the multimedia capabilities of the computer 18 for the non-voice media sessions. The CUA logic 46 will also cooperate with the legacy adapter 42 to provide the necessary call signaling for the telephony switch 24 to control voice communications with the telephone 22. Accordingly, the CUA logic 46 cooperates with the legacy adapter 42 and the multimedia client adapter 44 to provide an interface to the computer 18 as well as an interface to the telephony switch 24, and an interface for communications with other devices, such as the proxy 16. In an exemplary embodiment, the CUA 14 may be incorporated into the Interactive Multimedia Server sold by Nortel Networks Limited of 2351 Boulevard Alfred-Nobel, St. Laurent, Quebec, Canada, H4S 2A9.

Figure 5:
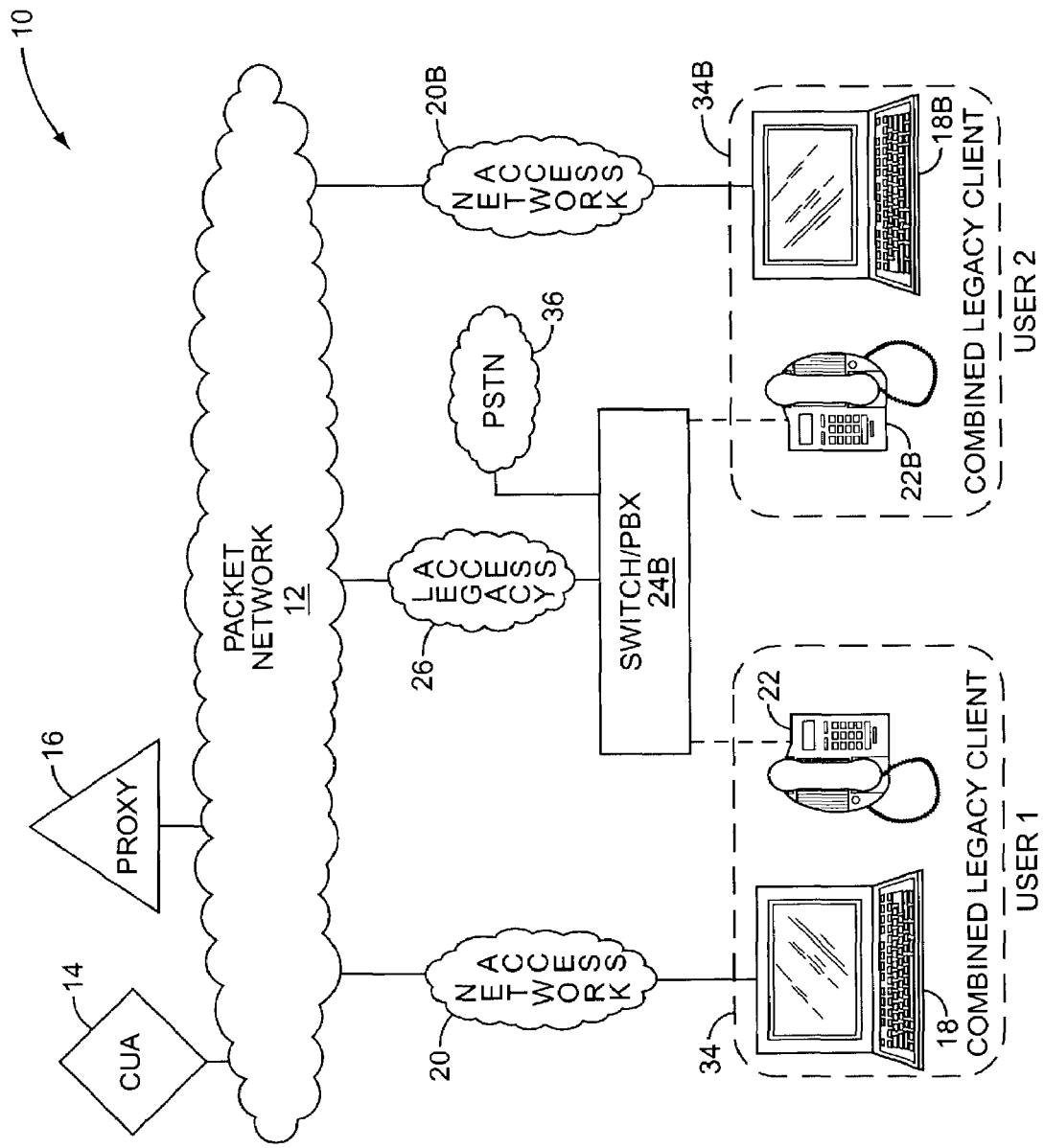
FIG. 5 is an exemplary embodiment of the present invention integrated into a communication environment.

Against this backdrop, the present invention is readily implemented as seen in FIG. 5. A second client 34B exists with a computer 18B and a telephone 22B. The telephones 22, 22B may be communicatively coupled to the switch 24B while the computers 18, 18B may each have independent network accesses 20, 20B (shown) to the packet network 12. Alternatively, the computer 18B may share the network access 20 (not shown) of the client 34. The switch 24B may be an internal public branch exchange (PBX) for an enterprise or similar device and is programmed to allow telephones 22, 22B to share a common directory number or extension number. Depending on the nature of the switch 24B, a legacy access 26 may be positioned between the switch 24B and the packet network 12. The CUA 14 serves both clients 34, 34B as previously described.

Figure 6:
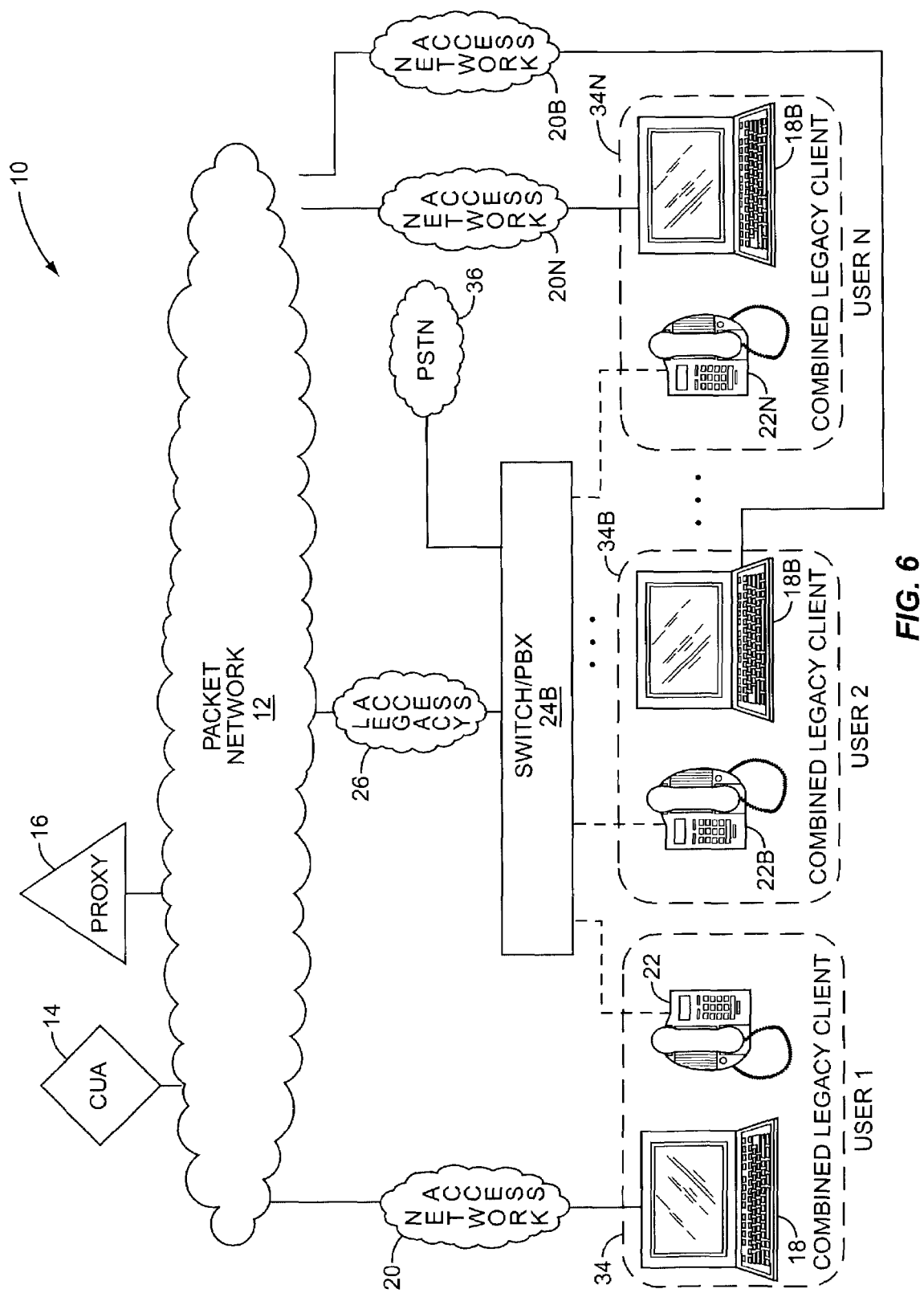
FIG. 6 is a second embodiment of the present invention.

An alternate embodiment is illustrated in FIG. 6, where a plurality of clients 34, 34B–34N may exist. While clients B–N are contemplated, other numbers of clients may be present. In this instance, N represents an arbitrary number of clients. Again, the clients 34, 34B–34N may have separate network accesses 20, 20B–20N or share a single network access 20. All of the telephones 22, 22B–22N are communicatively connected to the switch 24B. Again, the switch 24B may be an internal PBX for an enterprise. The telephones 22, 22B–22N and computers 18, 18B–18N are served by one or more CUA 14, although a single CUA 14 is preferred. The telephones 22, 22B–22N may share a directory or extension number as described above.

Figure 7:
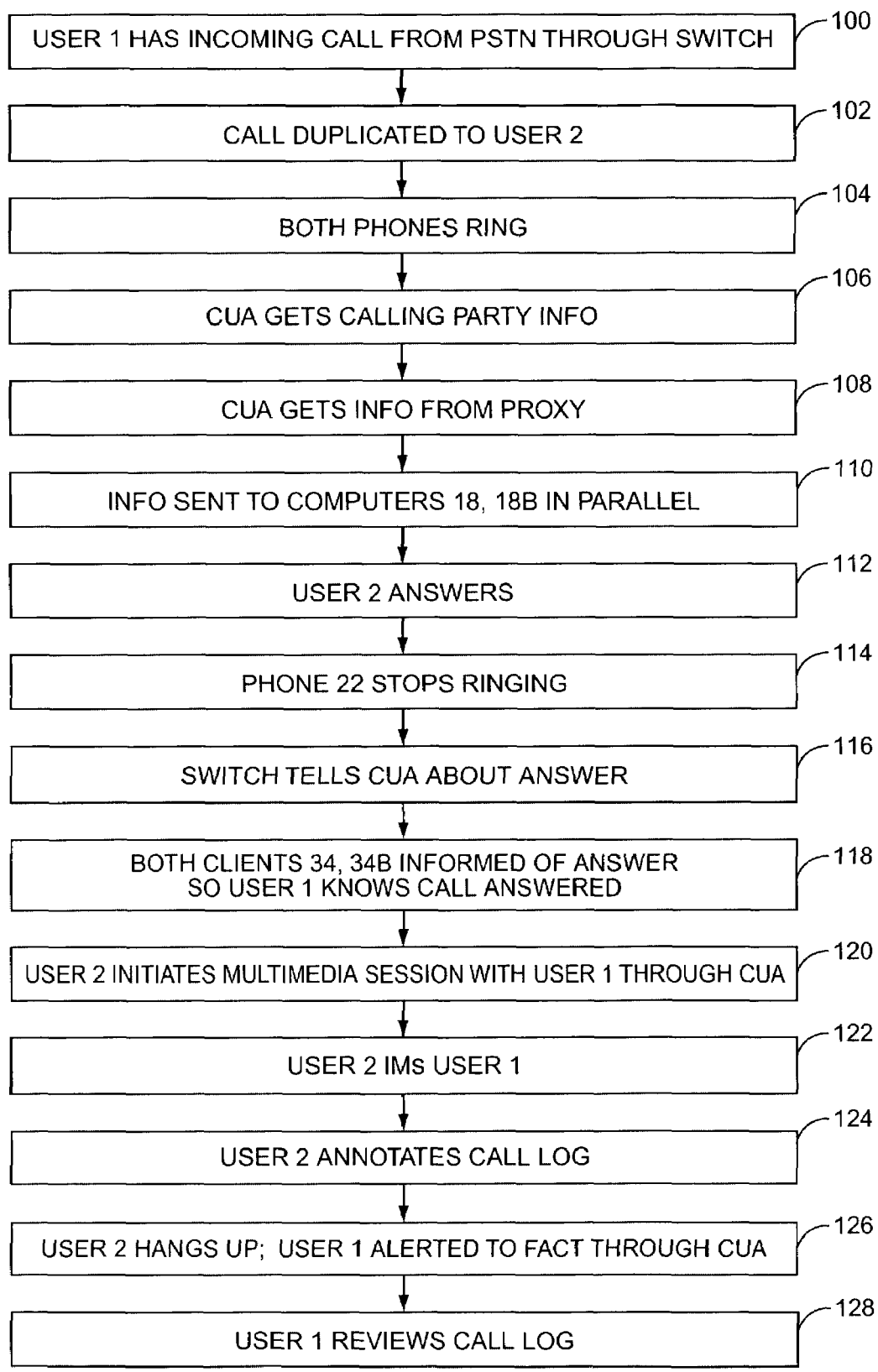
FIG. 7 is a flow chart of the methodology of the present invention for an incoming call.
Figure 8:
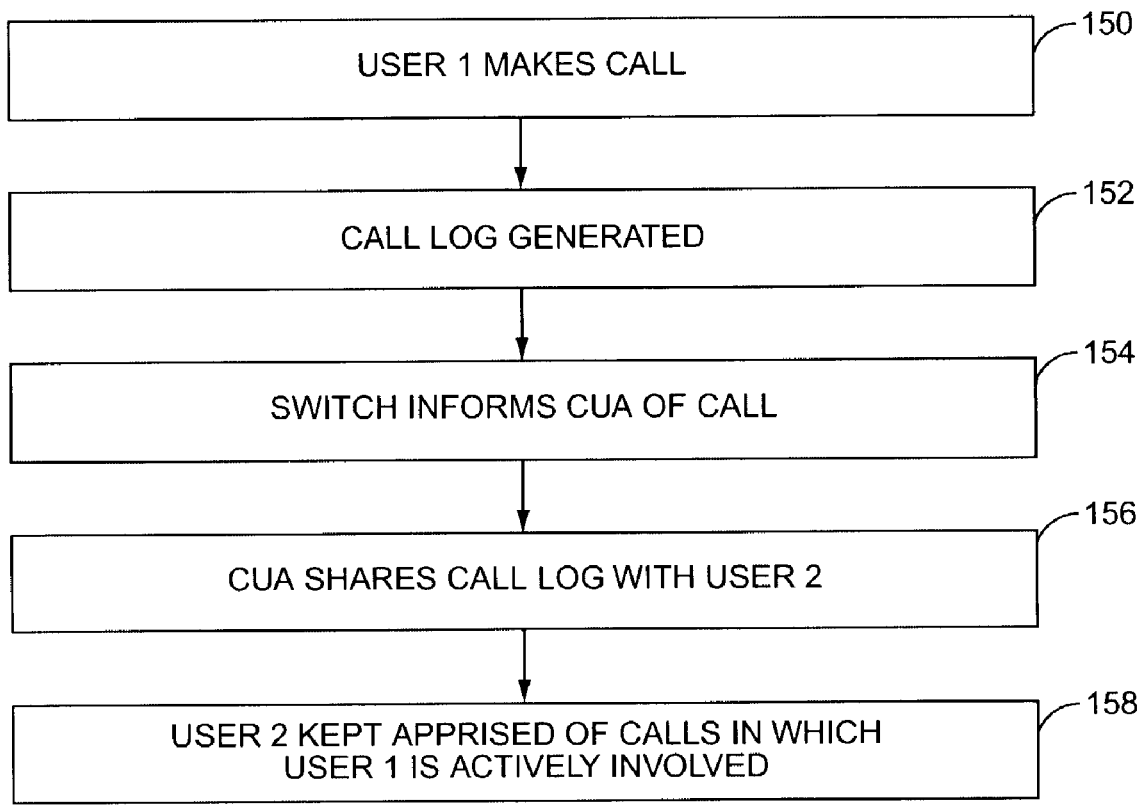
FIG. 8 is a flow chart of the methodology of the present invention for an outgoing call.

The methodology of the present invention is illustrated in FIGS. 7 and 8. An incoming call is initially illustrated in FIG. 7 assuming a two client environment such as that illustrated in FIG. 5. User 1, associated with the client 34, has an incoming call from the PSTN 36 through the switch 24B (block 100). The call is duplicated by the switch 24B such that the call also is directed to user 2 (block 102). Both telephones 22, 22B ring (block 104). The CUA 14 gets information about the calling party from the switch 24B (block 106). The CUA 14 may interact with the SIP proxy 16 to get specific features or information to perform call screening and routing based on a pre-established user profile if needed or desired (block 108). As an example, user 1 may want all calls except the ones from a pre-defined list to be forwarded to user 2.

The incoming call information and any information from the proxy 16 may appear on computers 18, 18B in parallel (block 110). This may appear in a pop up window, in a call management window that has already been opened, or otherwise as needed or desired. For the sake of simplicity, the present disclosure assumes that user 2 answers (block 112); however, it is readily apparent to those of ordinary skill in the art that the process is essentially the same, albeit reversed, if user 1 answers.

The telephone 22 stops ringing in response to user 2 answering the call (block 114). The switch 24B may inform the CUA 14 that the call has been answered (block 116) including informing the CUA 14 that user 2 answered the call. Alternatively, the client 34B may inform the CUA 14 that the call has been answered as part of the SIP communications therebetween. Both clients 34, 34B may be informed of the answered call so that user 1 knows that the call has been answered (block 118).

At this point, many things may happen depending on the needs of the parties. However, for the sake of example, user 2 may initiate a multimedia session with user 1 through the CUA 14 (block 120). This multimedia session may be an instant messaging (IM) activity (block 122), a video conference, document sharing, or other multimedia activities. Shortcuts to achieve the more common activities may have been created on the desktop of the computer 18B if desired. As yet another option, user 2 may record a voice message on computer 18B and forward this voice message to computer 18.

User 2 may also access the call logs for user 1 for the purpose of annotating the call logs (block 124). When user 2 terminates the call, user 1 is alerted to this fact through the CUA 14 (block 126). Specifically, the switch 24 may alert the CUA 14 that the call has been terminated, and the CUA 14 alerts user 1. Alerts may be done through an audio tone from the computer 18, the telephone 22, a visual indication on either device, or other appropriate alert. Note that the call logs may be stored in memory associated with the CUA 14 or may be stored at the computers 18, 18B. The call logs may be passed back and forth as needed, or accessed, stored, and/or updated at the memory as needed.

User 1 may subsequently review the call logs (block 128) and see the annotations provided by user 2. The annotations may be voice or text messages, thereby replacing physical paper message notes. When user 1 reviews the call logs, user 1 may make a more informed decision about how to return the call with the assistance of the annotations. Alternatively, user 1 may review the call log while the call is still in progress (i.e., before the call is terminated). Note that in general, the present invention need not occur in the linear fashion as indicated by the flow chart of FIG. 7, but rather, commands may be made as needed, connections formed in response to commands, and the call passed back and forth between user 1 and user 2 as needed. The methodology of FIG. 7 is provided by way of guidance, and other variations in the order are readily apparent to those of ordinary skill in the art.

As an example, user 2 may be an administrative assistant for user 1. When a call comes in from an unknown source, user 2 may answer the call and determine that the call is from a prospective client. User 2 instant messages user 1 to see if user 1 is available to take the call. User 1 assents, and user 2 transfers the call to user 1 using features on the switch 24B or through the CUA 14.

Note that there are many permutations in how the present invention may be implemented. Many of the elements of the communication environment 10 may be equipped with microprocessors that act upon instructions embedded in software or in sequential logic. The software may be resident upon a computer readable medium or in memory associated with the microprocessor. Further, while the particular embodiment shows certain functionalities associated with certain elements, it is possible that the functionalities may be rearranged or redistributed without departing from the scope of the present invention.

Outgoing calls are illustrated in FIG. 8. While there are numerous variations on the theme of this process, an exemplary embodiment is presented below. Specifically, this embodiment assumes that user 1 shares information fully with user 2. It is possible that some or all sharing may be restricted. In this embodiment, user 1 makes a call (block 150). This call is routed to the switch 24B, and the switch 24B alerts the CUA 14. The switch 24B or the CUA 14 may route the call to the PSTN 36 so that the call may be completed as previously described. During the making of this call, a call log may be generated (block 152). This call log may be stored at the switch 24B, the CUA 14, on the computer 18, on the telephone 22, or other device as needed or desired. Regardless of routing, the switch 24B informs the CUA 14 that the call is occurring (block 154). The CUA 14 may then share the call log with user 2 (block 156). This sharing may be done concurrently so that user 2 is kept apprised of calls in which user 1 is involved as they occur (block 158) or subsequently as needed or desired. Further, any multimedia sessions in which user 1 is involved may be shared with user 2 (not shown). In this manner, the user 1 may share call information with user 2 and bring in user 2 as needed or desired.

For example, user 1 may place a call, alerting user 2 as to that fact. User 1 may need a document to share with the called party. User 1 instant messages user 2 to retrieve the document. While user 1 continues to converse with the called party, user 2 retrieves the document electronically and makes the document appear on user 1's computer 18. User 1 then sends the document to the called party. Of course, other uses of this technology could also be possible.

Expanding the concept of the methodology of FIGS. 7 and 8 to multiple clients 34, 34B–34N, such as the embodiment of FIG. 6, is a simple extension. The CUA 14 shares the information amongst all the clients 34, 34B–34N according to the sharing restrictions in a user's profile or other regime as needed or desired.

Figure 9:
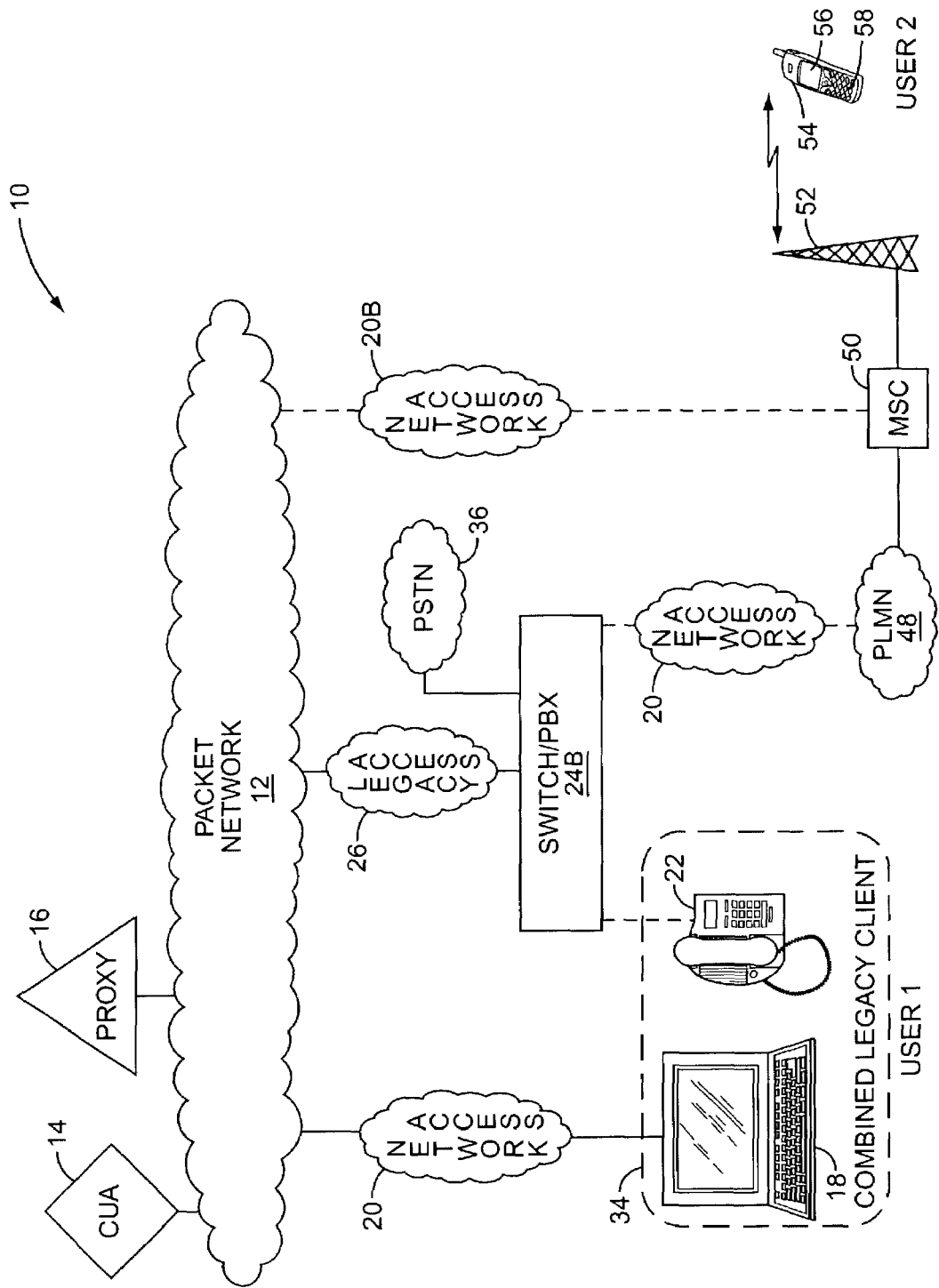
FIG. 9 is a third embodiment of the present invention integrated into a wireless environment.

Likewise, the present invention is also well suited for use in a mobile environment as illustrated in FIG. 9. In this embodiment, the switch 24B may interface the public land mobile network (PLMN) 48 through an appropriate network access 20 as is well understood. The PLMN 48 may include one or more mobile services switching centers (MSC) 50 (only one shown) that use an antenna 52 (or multiple antennas, not shown) to communicate with mobile terminals 54 (only one shown). The MSC 50 may communicate with the packet network 12 via a network access 20 as is well understood. The communication between the MSC 50 and the mobile terminals 54 may be by any conventional standard such as WCDMA, D-AMPs, GSM, and the like. The CUA 14 sets up parallel voice and data sessions through the MSC 50 to the mobile terminals 54. The mobile terminals 54 may share directory numbers, just like the desktop telephones 22. In this embodiment, the mobile terminal 54 acts as both the telephone 22 and the computer 18, although they could be separate devices if needed. It is particularly contemplated that display 56 may work with keyboard 58 to mimic some of the functions of the computer 18B.

In short, the present invention is well suited for use by people sharing a directory number or an extension. Such individuals may swap multimedia content via instant messaging, whiteboarding, video conferencing, and other programs as well as share comments about incoming or outgoing calls so that a consistent approach is taken by both parties without the need for transferring paper messages. Other uses will be readily apparent to those of ordinary skill in the art without departing from the scope of the present invention, Those skilled in the art will recognize improvements and modifications to the preferred embodiments of the present invention. All such improvements and modifications are considered within the scope of the concepts disclosed herein and the claims that follow.

What is claimed is:

1. A method of handling incoming calls to at least two clients comprising:
   arranging for an incoming call to arrive on equipment associated with the at least two clients;
   passing information associated with die incoming call to a combined user agent associated with the at least two clients; and
   initiating a multimedia session between the at least two clients relating to the incoming call.

2. The method of claim 1 wherein arranging for an incoming call to arrive on equipment associated with the at least two clients comprises arranging for an incoming call to arrive on telephones associated with the at least two clients.

3. The method of claim 1 further comprising ringing the equipment associated with the at least two clients.

4. The method of claim 3 further comprising receiving an indication at the combined user agent that one of the at least two clients has answered the incoming call.

5. The method of claim 4 further comprising sending an indication to the equipment associated with the one of the at least two clients who did not answer the call that the call has been answered.

6. The method of claim 1 wherein initiating a multimedia session between the at least two clients comprises allowing one of the at least two clients to send an instant message to the other.

7. The method of claim 1 wherein initiating a multimedia session between the at least two clients comprises sending an annotated call log from one client to another.

8. The method of claim 1 further comprising accessing a call log associated with the combined user agent.

9. The method of claim 1 wherein initiating a multimedia session between the at least two clients comprises sending a document from one client to another.

10. The method of claim 1 wherein initiating a multimedia session between the at least two clients comprises initiating multimedia activity selected from the group consisting of: sharing a whiteboard application, sending a document from one client to another, initiating a video communication session, sharing a call log, accessing a call log, and sending an instant message.

11. The method of claim 1 wherein initiating a multimedia session between the at least two clients comprises sharing a multimedia application between the at least two clients.

12. The method of claim 1 wherein arranging for an incoming call to arrive on equipment associated with the at least two clients comprises arranging for an incoming call to arrive on at least one piece of wireless communication equipment.

13. A method of handling outgoing calls between at least two clients comprising:
   receiving information for an outgoing call from one of the at least two clients at a combined user agent associated with the at least two clients; and
   sharing multimedia information relating to the outgoing call with the others of the at least two clients.

14. The method of claim 13 wherein sharing the multimedia information relating to the outgoing call with the others of the at least two clients comprises receiving at the combined user agent a request to initiate an instant message from one of the at least two clients.

15. The method of claim 13 wherein sharing the multimedia information relating to the outgoing call with the others of the at least two clients comprises receiving an annotated call log from one of the at least two clients.

16. The method of claim 15 further comprising providing the annotated call log to the others of the at least two clients.

17. The method of claim 13 wherein sharing the multimedia information comprises storing multimedia information relating to the outgoing call at the combined user agent and accessing the multimedia information relating to the outgoing call from the combined user agent.

18. The method of claim 13 wherein sharing the multimedia information relating to the outgoing call with the others of the at least two clients comprises sharing a document.

19. The method of claim 13 further comprising alerting the others of the at least two clients as to existence of the outgoing call.

20. A method of sharing information about a call comprising:
   associating at least two clients with a combined user agent;
   directing incoming calls to the at least two clients;
   initiating a multimedia session between the at least two clients; and
   transferring information relating to the call during the multimedia session.

21. The method of claim 20 wherein associating at least two clients with a combined uscr agent comprises associating the at least two clients with a combined user agent through a session initiation protocol.

22. The method of claim 20 wherein directing incoming calls to the at least two clients comprises ringing telephones at the at least two clients.

23. The method of claim 22 further comprising alerting the others of the at least two clients that one of the at least two clients has answered a ringing telephone.

24. The method of claim 20 further comprising alerting the others of the at least two clients tat one of the at least two clients has initiated an outgoing call.

25. The method of claim 24 further comprising transferring information relating to the outgoing call during the multimedia session.

26. The method of claim 20 wherein associating at least two clients with a combined user agent comprises associating at least one wireless client with the combined user agent.

27. A computer readable medium comprising software adapted to:
   arrange for an incoming call to arrive on equipment associated with at least two clients; and
   pass information about the incoming call to a combined user agent associated with the at least two clients so that the combined user agent may initiate a multimedia session between the at least two clients relating to the incoming call.

28. The computer readable medium of claim 27 wherein said software is further adapted to arrange for an incoming call to arrive on telephones associated with the at least two clients.

29. The computer readable medium of claim 27 wherein said software is further adapted to ring equipment associated with the at least two clients.

30. The computer readable medium of claim 29 wherein said software is further adapted to receive an indication that one of the at least two clients has answered the incoming call and pass an indication to the combined user agent tat one of the at least two clients has answered the incoming call.

31. The computer readable medium of claim 27 wherein said software is further adapted to receive information about an outgoing call from one of the at least two clients at a combined user agent associated wit the at least two clients.

32. The computer readable medium of claim 31 wherein said software is further adapted to alert the others of the at least two clients that the outgoing call has been initiated by sending an indication of such to the combined user agent.

33. The computer readable medium of claim 27 wherein said software that arranges for an incoming call to arrive on equipment associated with the at least two clients comprises software that arranges for the incoming call to arrive on at least one wireless piece of equipment.

34. A system for integrating multimedia sessions between clients sharing a phone number comprising:
a combined user agent adapted to:
receive an indication of an incoming call; and
initiate a multimedia session between at least two clients sharing a phone number relating to the incoming call.

35. The system of claim 34 wherein said combined user agent is further adapted to receive an indication that one of the at least two clients has answered the incoming call.

36. The system of claim 35 wherein said combined user agent is further adapted to send an indication to equipment associated with the one of the at least two clients who did not answer the call that the call has been answered.

37. The system of claim 34 wherein said combined user agent is further adapted to allow one of the at least two clients to send an instant message to the other.

38. The system of claim 34 wherein said combined user agent is further adapted to send an annotated call log from one client to another.

39. The system of claim 34 wherein said combined user agent is further adapted to send a document from one client to another.

40. The system of claim 34 wherein the combined user agent adapted to initiate a multimedia session between at least two clients initiates a multimedia session between at least one client having wireless equipment.

41. A system for integrating multimedia sessions between clients sharing a phone number comprising:
a combined user agent adapted to:
receive an indication of an outgoing call; and
initiate a multimedia session between at least two clients sharing a phone number, said multimedia session relating to the outgoing call.

42. The system of claim 41 wherein said combined user agent is further adapted to receive a request to initiate an instant message from one of the at least two clients.

43. The system of claim 41 wherein said combined user agent is Thither adapted to receive an annotated call log from one of the at least two clients.

44. The system of claim 43 wherein said combined user agent is Thither adapted to provide the annotated call log to others of the at least two clients.

45. The system of claim 41 wherein said combined user agent Thither shares a document between the at least two clients as part of the multimedia session.

* * * * *

UNITED STATES PATENT AND TRADEMARK OFFICE
CERTIFICATE OF CORRECTION

PATENT NO. : 7,050,565 B2
APPLICATION NO. : 10/261577
DATED : May 23, 2006
INVENTOR(S) : Dany Sylvain It is certified that error appears in the above-identified patent and that said Letters Patent is hereby corrected as shown below:

Col. 9, line 6, replace "die" with --the--.

Col.10, line 35, replace "tat" with --that--.

Col. 10, line 62, replace "tat" with --that--.

Col. 10, line 67, replace "wit" with --with--.

Col. 12, line 19, replace "Thither" with --further--.

Col. 12, line 22, replace "Thither" with --further--.

Col. 12, line 25, replace "Thither" with --further--.

Signed and Sealed this

Fifteenth Day of August, 2006

JON W. DUDAS
*Director of the United States Patent and Trademark Office*